(12) United States Patent
Liptak et al.

(10) Patent No.: US 9,391,441 B2
(45) Date of Patent: Jul. 12, 2016

(54) ZONE SELECTIVE INTERLOCKING FOR OPTICAL FLASH DETECTION SUPPRESSION

(75) Inventors: Julius Michael Liptak, Knightdale, NC (US); John Kenneth Mackenzie, IV, Raleigh, NC (US)

(73) Assignee: Schneider Electric USA, Inc., Schaumburg, IL (US)

(*) Notice: Subject to any disclaimer, the term of this patent is extended or adjusted under 35 U.S.C. 154(b) by 655 days.

(21) Appl. No.: 13/610,992

(22) Filed: Sep. 12, 2012

(65) Prior Publication Data

US 2014/0071569 A1 Mar. 13, 2014

(51) Int. Cl.
*H02H 3/00* (2006.01)
*H02H 9/08* (2006.01)
*H02H 1/00* (2006.01)
*H02H 7/26* (2006.01)
*H02H 7/30* (2006.01)
*H02H 7/00* (2006.01)
*H02H 7/22* (2006.01)

(52) U.S. Cl.
CPC ............ *H02H 1/0023* (2013.01); *H02H 7/263* (2013.01); *H02H 7/30* (2013.01); *H02H 7/22* (2013.01)

(58) Field of Classification Search
CPC ............ H02H 3/26; H02H 9/00; H01H 83/00
USPC ...................................................... 361/2, 42
See application file for complete search history.

(56) References Cited

U.S. PATENT DOCUMENTS

| 5,835,319 | A | 11/1998 | Welles, II et al. |
| 5,905,615 | A * | 5/1999 | Rivetti et al. .................... 361/63 |
| 6,297,939 | B1 * | 10/2001 | Bilac et al. ....................... 361/64 |
| 6,339,525 | B1 * | 1/2002 | Neiger et al. .................... 361/42 |
| 7,791,846 | B2 | 9/2010 | Roscoe et al. |
| 8,270,136 | B2 * | 9/2012 | Vicente et al. ............... 361/93.2 |
| 8,351,171 | B2 * | 1/2013 | Payack ............................ 361/62 |
| 8,593,769 | B2 * | 11/2013 | Schweitzer, III ............... 361/42 |
| 2010/0149700 | A1 | 6/2010 | Hastings et al. |

FOREIGN PATENT DOCUMENTS

WO    2010033830 A1    3/2010

\* cited by examiner

*Primary Examiner* — Thienvu Tran
*Assistant Examiner* — Lucy Thomas
(74) *Attorney, Agent, or Firm* — Coats & Bennett, PLLC

(57) ABSTRACT

Nuisance tripping is reduced in a power protection and distribution system including an upstream circuit breaker, a power distribution bus, and one or more downstream circuit breakers. A signal indicative of a current or pending downstream circuit breaker tripping action, such as a Zone Selective Interlocking (ZSI) signal, normally used to delay tripping of the upstream breaker, is used to suppress an optical flash detection system from tripping the upstream breaker in response to an optical flash resulting from the tripping of the downstream breaker. In this way, nuisance tripping of the upstream breaker is avoided when the downstream breaker trips (and the ZSI function is preserved).

17 Claims, 4 Drawing Sheets

ZONE SELECTIVE INTERLOCKING FOR OPTICAL FLASH DETECTION SUPPRESSION

FIELD OF INVENTION

The present invention relates generally to power protection and distribution systems, and in particular to optical flash detection suppression using zone selective interlocking signaling.

BACKGROUND

A power protection and distribution system is typically installed at every building, factory, or similar facility, where the main electrical power from the grid enters the facility. The power protection and distribution system—also referred to as "switchgear"—usually includes a main circuit breaker at the electrical point furthest upstream, or closest to the external main power grid; a power distribution bus, which may comprise, e.g., copper bars for each positive power phase and one or more ground bus bars; and one or more downstream circuit breakers, each protecting an electrical circuit distributing power to a zone, or area, of the facility. The purpose of the circuit breakers is to protect downstream circuits from overcurrent conditions, such as would occur in the event of a short circuit.

Circuit breakers operate in a variety of ways. For example, one type of circuit breaker determines an overcurrent condition by detecting excessive heat generated by large currents moving through resistive conductors. While such circuit breakers will interrupt a faulty circuit in time to avoid a fire, sensitive downstream electrical equipment may be damaged by the overcurrent condition prior to the circuit breaker interrupting the current flow. Accordingly, to provide a more timely circuit interruption operation, various means of detecting short-circuits and other overcurrent conditions are known in the art. One example is an optical flash detector. In many cases, the cause of a short-circuit condition—such as a foreign object, a rodent, or the like, establishing a conductive path across terminals or nodes of the power distribution bus—will generate a spark, arc, flame, glow of molten metal, or other optical flash. An optical detector, such as a photodetector and associated control circuits, may, upon detection of an optical flash, transmit a signal to an upstream circuit breaker, causing the breaker to trip immediately.

However, optical flashes occur in switchgear that should not necessarily trigger an upstream circuit breaker to trip. For example, air break interruption equipment, such as many circuit breakers, generates an arc as the connection between current-carrying contacts is broken. Thus, a downstream circuit breaker tripping due to an overcurrent condition on the circuit downstream of that circuit breaker may generate an optical flash. In this case, only the affected downstream circuit breaker should trip. However, if an optical flash detector registers an arc or other optical flash when the circuit breaker trips, it will cause the upstream (e.g., main) circuit breaker to trip, unnecessarily shutting down power to the entire facility. This is known as "nuisance tripping," and should be avoided.

A variety of approaches are known to avoid nuisance tripping. These include controlling placement of optical sensors, such as locating them away from nuisance light sources, or adjusting their placement such that nuisance light sources are out of the field of view of the optical detector; reducing the power system short-circuit current at the switchgear to levels that limit nuisance light production by devices such as circuit breakers; and the like. In practice, these solutions have been found deficient. For example, it may be difficult or impossible to place or orient optical sensors so that they have a full field of view of some optical flashes, while shielding them from others. Also, reducing the current to limit circuit breaker flash intensity also reduces the current generally, which may require duplication of protected circuits to supply the necessary power.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure, and is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments described and claimed herein, a signal indicative of a current or pending downstream circuit breaker tripping action, such as a Zone Selective Interlocking (ZSI) signal, normally used to delay tripping of an upstream breaker, is used to suppress an optical flash detection system from tripping the upstream breaker in response to an optical flash resulting from the tripping of the downstream breaker. In this way, nuisance tripping of the upstream breaker is avoided when the downstream breaker trips (and the ZSI function is preserved).

One embodiment relates to a method of suppressing an optical flash detection signal in a power protection and distribution system comprising at least an upstream circuit breaker, a power distribution bus, and one or more downstream circuit breakers. A trip signal from a downstream circuit breaker, indicating a current or pending tripping action of the downstream circuit breaker, is received. In response to the trip signal, operation of an optical flash detector system is suppressed, so as to not generate an optical flash detection signal to the upstream circuit breaker that would otherwise result from an optical flash caused by the downstream breaker tripping.

Another embodiment relates to a power protection and distribution system including a housing. Within the housing, the system includes an upstream circuit breaker connected to a source of electrical power and a plurality of downstream circuit breakers, each connected to a separate power distribution circuit and operative to generate a trip signal during or prior to tripping. The system also includes a power distribution bus electrically connecting the upstream circuit breaker and the plurality of downstream circuit breakers. The system further includes an optical flash detection system comprising at least one optical sensor and operative to signal the upstream circuit breaker to trip in response to an optical flash detected by an optical sensor. Operation of the optical flash detection system is suppressed upon activation of a trip signal by a downstream circuit breaker, where the trip signal indicates a current or pending tripping action by the downstream circuit breaker.

BRIEF DESCRIPTION OF THE DRAWINGS

Embodiments of the present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
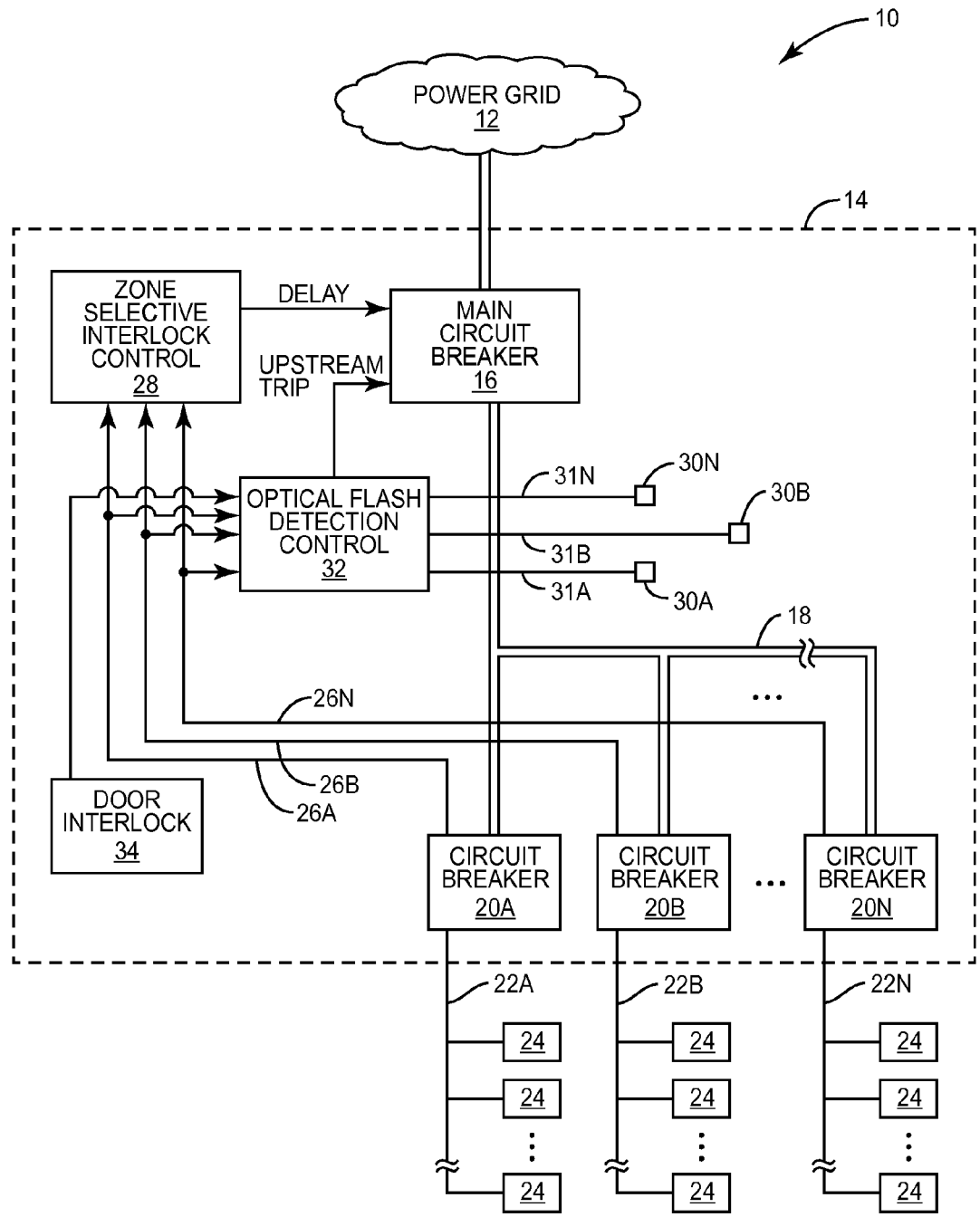
FIG. 1 is a block diagram of a power protection and distribution system.

FIG. 1 depicts an exemplary power protection and distribution system, indicated generally by the numeral 10. Electrical power from the power grid 12 is received by switchgear 14, which houses a main upstream circuit breaker 16, power distribution bus 18, and a plurality of downstream circuit breakers 20A, 20B, . . . 20N. Although a plurality of circuit breakers 20A, 20B, . . . 20N are pictured—as this is the typical installation—embodiments of the present invention may be advantageously deployed in a system 10 having only one downstream circuit breaker 20. The main breaker 16 protects the entire facility, and is rated to pass the highest anticipated sustained current. The power distribution bus 18 may comprise, e.g., solid copper bars capable of conducting large currents. Each downstream circuit breaker 20A, 20B, . . . 20N is rated for a lower current, and distributes power on a separate power distribution circuit 22A, 22B, . . . 22N, respectively, to a plurality of electrical loads 24. Each circuit 22A, 22B, . . . 22N typically distributes electrical power to a separate zone, or area, of a facility.

When a load 24 on a power distribution circuit 22 attempts to draw excessive current, or if a short-circuit condition develops on a circuit 22, the corresponding downstream circuit breaker 20 experiences current flow in excess of its rated capacity. Simultaneously, of course, the main circuit breaker 16 also experiences an increased current flow, due to the series topology between the two. Ideally, only the downstream circuit breaker 20 experiencing the excess current should trip, providing overcurrent protection only on its corresponding power distribution circuit 22. However, because the main circuit breaker 16 also experiences an overcurrent condition, it may also trip, interrupting power to the entire facility.

To prevent this, the Zone Selective Interlocking (ZSI) feature was developed, and is widely deployed. In a ZSI system, a downstream circuit breaker 20 that experiences an overcurrent condition sufficient to trip the breaker 20 generates a trip signal 26A, 26B, . . . 26N—also referred to as a ZSI signal 26A, 26B, . . . 26N—just prior to tripping, which delays the main circuit breaker 16 from tripping for at least a predetermined duration. This allows the affected downstream circuit breaker 20 to trip, interrupting power to only its respective power distribution circuit 22. If this interruption terminates the overcurrent condition, then the main circuit breaker 16 need not trip, and power on the other distribution circuits 22 is not interrupted. A ZSI controller 28 receives trip signals 26 from all downstream circuit breakers 20, and generates a DELAY signal to suppress the main circuit breaker 16 from tripping. The ZSI controller 28 may include a timer function, such that the main circuit breaker 16 is suppressed from tripping only for a brief duration (e.g., 150-300 msec). If the main circuit breaker 16 continues to experience an overcurrent condition after the expiration of the ZSI DELAY signal, it will proceed to trip, to protect the facility.

The trip signal 26 may, for example, be the output of an electrical trip determination circuit within the downstream circuit breaker 20, which causes the breaker 20 to trip. Because the actual circuit interruption results from mechanically separating switch contacts in the downstream circuit breaker 20, the trip signal 26 may precede the circuit breaker 20 tripping by several milliseconds. ZSI is defined in the IEEE Standard 1015-1997, *IEEE Recommended Practice for Applying Low-Voltage Circuit Breakers Used in Industrial and Commercial Power Systems*, for the edification of the reader. In some embodiments, the trip signal 26 may be generated externally of the monitored downstream circuit breaker 20. As used herein, a ZSI signal is one example of a trip signal, which includes, in general, any signal generated by a downstream circuit breaker 20 which indicates a pending or current tripping of the breaker 20.

The switchgear 14 additionally includes one or more optical sensors 30A, 30B, . . . 30N, such as photodiodes. An optical flash detection controller 32 receives optical flash detection signals 31A, 31B, . . . 31N from the respective optical sensors 30, and generates an UPSTREAM TRIP signal operative to cause the main circuit breaker 16 to immediately trip in response to detecting an optical flash. This provides enhanced protection, as many short-circuit events within the switchgear 14 cause a spark, arc, flame, or similar optical flash. However, in any particular implementation, it may be difficult to position and arrange optical sensors 30 to provide maximum protection against short-circuit events on the power distribution bus 18, while shielding the optical sensors 30 from light flashes out of the downstream circuit breakers 20. Circuit breakers 20 typically generate an arc flash when the switch contacts break apart in tripping. Additionally, due to the heat generated, the circuit breaker 20 switch contacts may glow, and/or give off intense infrared radiation, for several seconds after tripping. These optical events are sufficient to cause the optical flash detection system to trip the main breaker 16. Such nuisance tripping is undesirable, and in fact defeats the very purpose of the ZSI system—allowing a downstream circuit breaker 20 to trip without also immediately tripping the main circuit breaker 16.

According to embodiments of the present invention, the trip signals 26 from the downstream circuit breakers 20 are routed to the optical flash detection controller 32, as well as the ZSI controller 28. If the optical flash detection controller 32 receives an active trip signal 26, it temporarily suppresses any optical flash detection signal 31, and does not generate an UPSTREAM TRIP signal to the main circuit breaker 16. In one embodiment, the optical flash detection signals 31 are selectively suppressed—that is, an active trip signal 26 from a downstream circuit breaker 20 will only suppress an optical flash detection signal 31 if the corresponding optical sensor 30 is known to be positioned near enough that circuit breaker 20 in the switchgear 14 to generate a signal from an optical flash on either of the main bus 18 or the breaker 20. In this manner, a downstream circuit breaker 20 tripping due to an overcurrent condition on its power distribution circuit 22 will not suppress a main breaker 16 trip event due to an unrelated short on the power distribution bus 18 that causes an optical flash. Of course, the selective suppression of optical flash detection signals 31 by active trip signals 26 will be specific to the configuration of particular switchgear 14, and the distribution and position of optical sensors 30 therein.

To maximize the protection afforded by the main circuit breaker 16 while simultaneously avoiding nuisance tripping due to optical flash detection of downstream circuit breaker 20 tripping, suppression of the main circuit breaker 16 UPSTREAM TRIP signal by an active trip signal 26 should only occur for sufficient time for the downstream circuit breaker 22 complete its circuit interruption function. This may include the time necessary for the actual circuit breaker 20 tripping, as well as some additional delay to allow cooling of the circuit breaker 20 contacts. The optical flash detection system should be reactivated as soon as feasible following a downstream circuit breaker 20 tripping event. In one embodiment, a timer function is included in the logic in the optical flash detection controller 32. In one embodiment, the timer is adjustable, and may be "tuned" to the properties of specific downstream circuit breakers 20.

In some embodiments, suppression of optical flash detection by active trip signals 26 may itself be suppressed. For example, in one embodiment, a door interlock sensor 34 generates a signal to the optical flash detection controller 32 if a door or access panel of the switchgear 14 is open. In this event, the protection of personnel from exposure to arc gas and plasma emissions is more important than preventing nuisance tripping of the main circuit breaker 16. Accordingly, a downstream circuit breaker 20 generating a trip signal 26 would not suppress tripping of the main circuit breaker 16 due to an optical flash, if the door interlock sensor 34 indicates that a door is open.

Figure 2:
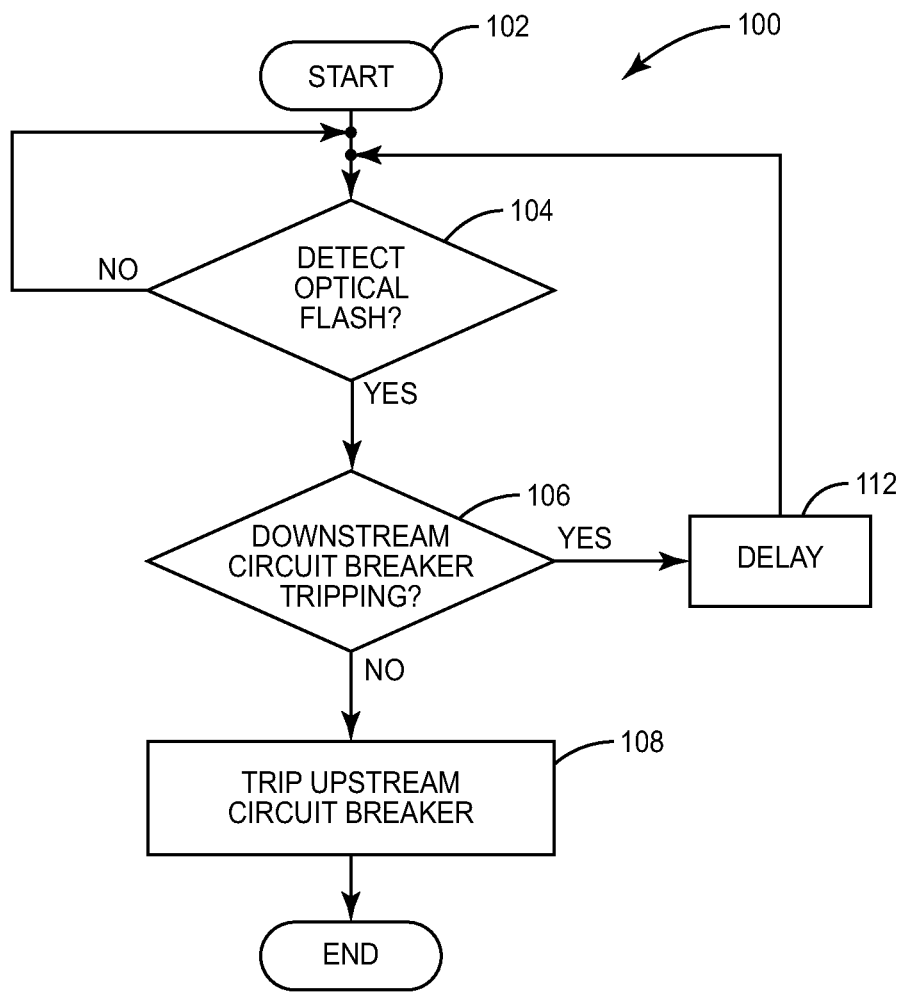
FIG. 2 is a flow diagram of a method of suppressing an optical flash detection signal.

FIG. 2 depicts a method 100 of enhanced power protection by optical flash detection in a power protection and distribution system 10 of FIG. 1. The method starts (block 102) when power is applied to the system 10. An optical flash detection system comprising optical sensors 30 and a controller 32 monitors the power distribution bus 18 to detect an optical flash (block 104). If an optical flash is detected, and no downstream circuit breaker 20 indicates that it is tripping (block 106), then the system trips the main circuit breaker 16 (block 108) and the method ends (block 110). However, upon detecting an optical flash (block 104), if a downstream circuit breaker 20 indicates that it is tripping (block 106), such as by asserting a trip signal 26, then the optical flash detection system delays (block 112) for a predetermined duration—not generating any UPSTREAM TRIP signal to trip the main circuit breaker 16—and returns to monitoring for an optical flash (block 104). In this manner, nuisance tripping of the main breaker 16 is avoided when the optical flash is caused by the tripping of a downstream circuit breaker 20.

Figure 3:
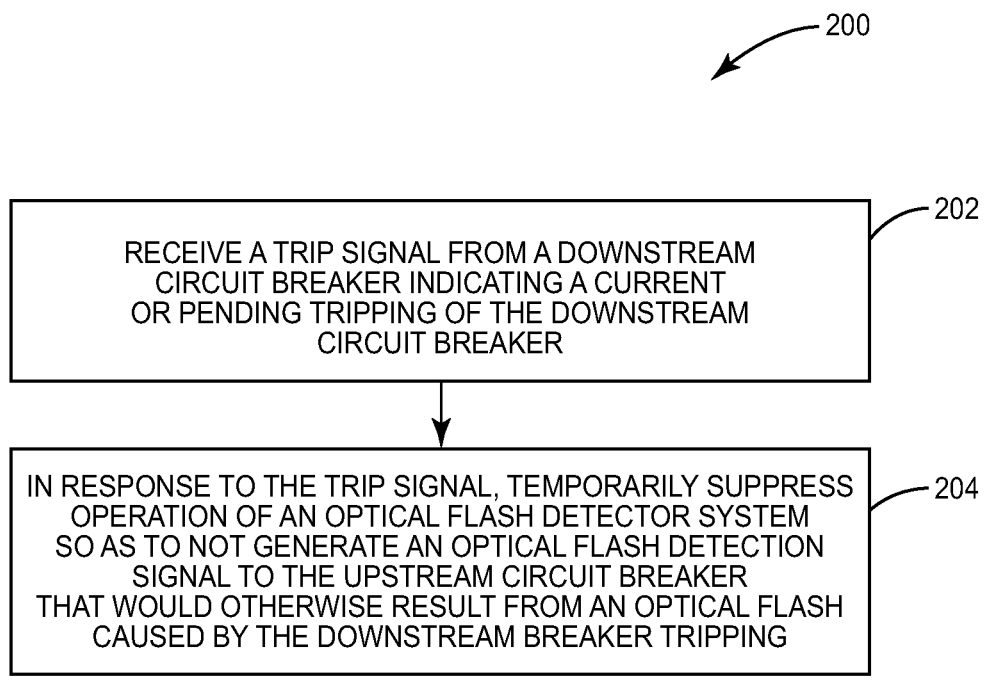
FIG. 3 is a flow diagram of a method of optical flash detection signal suppression performed by an optical flash detection controller.

FIG. 3 depicts specific steps of a method 200, performed in one embodiment by the optical flash detection controller 32, of suppressing an optical flash detection signal. A trip signal 26 is received from a downstream circuit breaker 20, indicating a current or pending tripping of the downstream circuit breaker 20 (block 202). The trip signal 26 may, for example, comprise a signal conforming to the ZSI specification. In response to the trip signal 26, operation of the optical flash detector system is temporarily suppressed so as to not generate an UPSTREAM TRIP signal to an upstream circuit breaker, such as the main circuit breaker 16, that would otherwise result from an optical flash caused by the downstream breaker 20 tripping (block 204).

Figure 4:
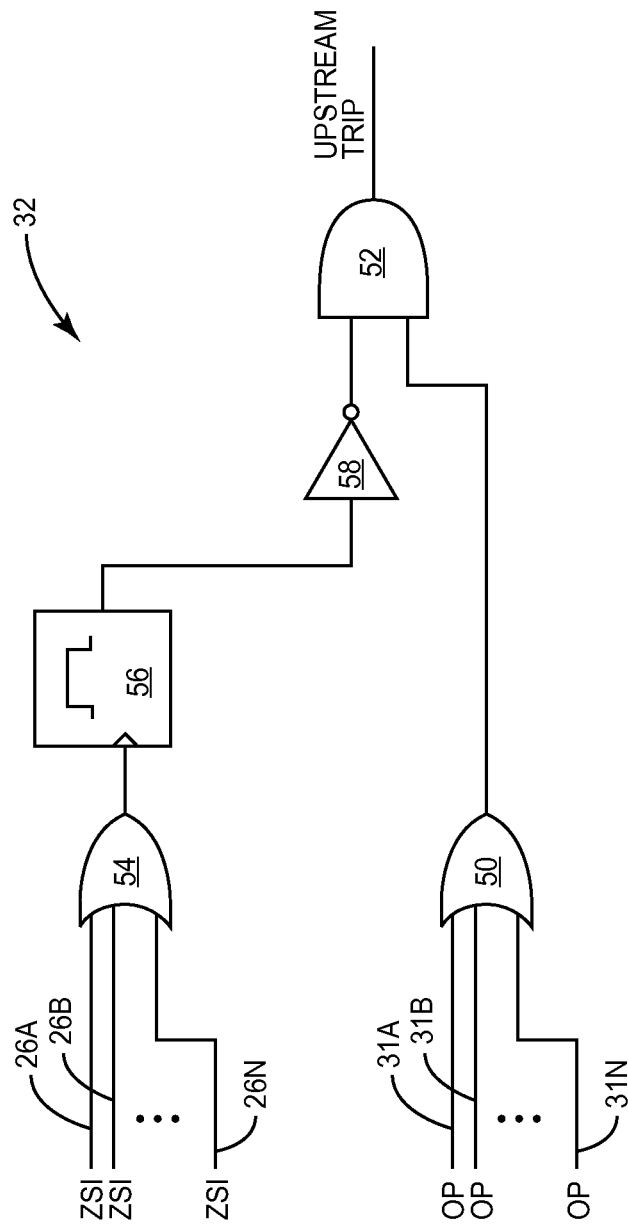
FIG. 4 is a schematic diagram of logical operations performed by an optical flash detection controller.

FIG. 4 depicts a schematic view of representative logic in the optical flash detection controller 32 according to one embodiment of the present invention. A plurality of optical flash detection signals 31A, 31B, . . . 31N are generated by a corresponding plurality of optical sensors 30A, 30B, . . . 30N disposed within the housing of the switchgear 14 of FIG. 1. The optical flash detection signals 31 are logically ORed together at logic function 50, the output of which is an input to a logical AND function 52. A plurality of trip signals 26A, 26B, . . . 26N, such as ZSI signals, are generated by a corresponding plurality of downstream circuit breakers 20A, 20B, . . . 20N. The trip signals 26 are logically ORed together at logic function 54, the output of which is an input to a timer function, such as a monostable multivibrator, or "one shot" 56. Once triggered by at least one of the trip signals 26 being active, the timer function 56 generates a positive output for a predetermined duration, which in one embodiment is adjustable. The output of the timer function 56 is inverted at logic function 58, the output of which is also an input to the logical AND function 52. The output of the AND function 52 is an UPSTREAM TRIP signal supplied to the main breaker 16.

The UPSTREAM TRIP signal is thus asserted if any optical sensor 30 detects an optical flash, AND it is NOT the case that any circuit breaker 20 indicated a current or pending trip. The timer function 56 preserves the NOT condition of that logical equation for a duration sufficient for a tripping circuit breaker 20 to dissipate any arc, and cool sufficiently so as not to trigger an optical sensor 30. Those of skill in the art will recognize that the schematic of FIG. 4 depicts logical relationships, and is not intended to represent actual circuit details. Furthermore, those of skill in the art may readily modify the logical functions depicted in FIG. 4 as required or desired for any particular implementation, given the teaching of the present disclosure. For example, particular trip signals 26 may be logically grouped together with optical flash detection signals 31 generated by optical sensors 30 that are proximate to the corresponding downstream circuit breakers 20. As another example, the output of the inverter function 58 may be logically ORed with a door interlock signal prior to being input to the AND function 52, effectively overriding the ZSI suppression if a door to the switchgear 14 is open.

Embodiments of the present invention provide numerous advantages over the prior art. They allow optical flash detection protection in areas of switchgear 14 such as at a main bus 18 near downstream circuit breakers 20, where the optical detection of optical flashes from the bus and the breakers might overlap, that would have remained unprotected in prior art systems due to the problem of nuisance tripping. Additionally, solutions presented herein are scalable and easily customized to specific switchgear 14 by those of skill in the art—for example, only optical flash detection signals 31 from optical sensors 30 disposed near downstream circuit breakers 20 need to be suppressed. Furthermore, embodiments of the present invention may take advantage of existing functionality, such as the ZSI signaling, providing a low-cost, high-reliability solution to the nuisance tripping problem.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of suppressing an optical flash detection signal in a power protection and distribution system comprising at least an upstream circuit breaker, a power distribution bus, and one or more downstream circuit breakers, comprising:
   receiving a trip signal from a downstream circuit breaker indicating a current or pending tripping action of the downstream circuit breaker; and
   in response to the trip signal, temporarily suppressing operation of an optical flash detector system so as to not generate an optical flash detection signal to the upstream circuit breaker that would otherwise result from an optical flash caused by the downstream breaker tripping, the optical flash detected by an optical sensor external to any circuit breaker.

2. The method of claim 1 wherein the trip signal comprises a Zone Selective Interlocking (ZSI) signal.

3. The method of claim 1 wherein temporarily suppressing operation of an optical flash detector system comprises suppressing operation of the optical flash detector system for a predetermined duration.

4. The method of claim 3 wherein the duration is adjustable.

5. The method of claim 1 wherein the optical flash detector system receives one or more optical flash detection signals from one or more corresponding optical sensors, and wherein temporarily suppressing operation of the optical flash detector system comprises suppressing only those optical flash detection signals generated by optical sensors positioned near the downstream circuit breaker generating the trip signal.

6. The method of claim 1 further comprising;
   receiving a door interlock signal indicating that a door of a housing containing the circuit breakers and power distribution bus is open; and
   in response to the door interlock signal, removing suppression of the operation of the optical flash detector system.

7. A power protection and distribution system including a housing, and comprising, disposed within the housing:
   an upstream circuit breaker connected to a source of electrical power;
   one or more downstream circuit breakers, each connected to a separate power distribution circuit and operative to generate a trip signal prior to or during tripping;
   a power distribution bus electrically connecting the upstream circuit breaker and the plurality of downstream circuit breakers;
   an optical flash detection system comprising at least one optical sensor disposed externally of any breaker and operative to monitor the power distribution bus and to signal the upstream circuit breaker to trip in response to an optical flash detected by an optical sensor;
   wherein operation of the optical flash detection system is suppressed upon activation of a trip signal by a downstream circuit breaker, the trip signal indicating a current or pending tripping action by the downstream circuit breaker.

8. The system of claim 7 wherein the trip signal comprises a Zone Selective Interlocking (ZSI) signal.

9. The system of claim 7 wherein operation of the optical flash detection system is suppressed for a predetermined duration upon activation of a trip signal by a downstream circuit breaker.

10. The system of claim 9 wherein the duration is adjustable.

11. The system of claim 7 wherein operation of the optical flash detection system is only suppressed if the optical flash is detected by an optical sensor that is known to be positioned near to the downstream circuit breaker generating the trip signal.

12. The system of claim 7 further comprising;
   a door interlock signal indicating that a door of the housing is open; and
   wherein operation of the optical flash detection system is not suppressed while the door interlock signal is active.

13. An optical flash detection controller operative in switchgear comprising an upstream circuit breaker connected to one or more downstream circuit breakers, comprising:
   one or more optical flash detector inputs, each operative to receive an optical detection signal from an optical detector disposed external to any circuit breaker;
   one or more trip signal inputs, each operative to receive a trip signal from a downstream circuit breaker indicating a current or pending tripping action of the downstream circuit breaker;
   an upstream tripping signal output operative to cause the upstream circuit breaker to trip; and
   a controller operative to selectively assert the upstream tripping signal output in response to detecting an optical flash, and further operative to suppress asserting the upstream tripping signal output if the optical flash is caused by a downstream circuit breaker tripping.

14. The controller of claim 13 wherein the trip signals connected to the trip signal inputs comprise Zone Selective Interlocking (ZSI) signals.

15. The controller of claim 13 further comprising a delay element operative to suppress asserting the upstream tripping signal output for a predetermined duration upon a current or pending downstream circuit breaker tripping action.

16. The controller of claim 15 wherein the predetermined duration is adjustable.

17. The controller of claim 15 further comprising an override input, and wherein the controller is further operative to override suppression of the upstream tripping signal output if the override input indicates that a door of a housing is open.

* * * * *